United States Patent [19]

Weiss

[11] 4,081,331

[45] Mar. 28, 1978

[54] PORTABLE WATER DISTILLATION APPARATUS

[76] Inventor: Gunther Weiss, 2025 SW. Briggs Ct., Beaverton, Oreg. 97005

[21] Appl. No.: 673,980

[22] Filed: Apr. 5, 1976

[51] Int. Cl.² .......................... B01D 5/00; B01D 3/42
[52] U.S. Cl. ................................ 202/181; 202/185 E; 202/193; 202/196; 203/DIG. 2; 203/10; 285/320; 202/83
[58] Field of Search ................. 202/83, 187, 181, 193, 202/196, 194, 195, 185 R, 185 C–185 E, 188, 190, 191, 192; 285/320; 203/10, 1, DIG. 2, DIG. 17

[56] References Cited

U.S. PATENT DOCUMENTS

| 497,742 | 5/1893 | Allderdice | 202/188 |
|---|---|---|---|
| 861,485 | 7/1907 | Stokes | 202/188 |
| 1,299,002 | 4/1919 | Jewell | 202/188 |
| 1,362,666 | 12/1920 | Badger | 203/10 |
| 1,931,838 | 10/1933 | Beraud | 202/187 |
| 2,360,572 | 10/1944 | Mejean | 285/320 |
| 2,837,469 | 6/1958 | Mohn | 203/10 |
| 3,513,076 | 5/1970 | Lowell | 203/10 |
| 3,694,321 | 9/1972 | Marovich et al. | 202/185 E |
| 3,980,526 | 9/1976 | Kirschmann | 203/10 |

*Primary Examiner*—Wilbur L. Bascomb, Jr.
*Attorney, Agent, or Firm*—Clarence A. O'Brien; Harvey B. Jacobson

[57] ABSTRACT

A distillation apparatus having an evaporator for vaporizing liquid to be distilled, a substantially vertically disposed up-and-down flowing condenser in communication with the evaporator for condensing vaporized liquid received from the evaporator, and a heater associated with the evaporator for applying heat to and vaporizing fluid in the evaporator. The condenser feeds liquid into the evaporator so as to maintain a constant level of liquid in the evaporator at the highest normal point of flow of liquid in the condenser. The vapor travels downwardly through the condenser so as to become condensed at the bottom of the condenser where a distilled water output is provided for discharge of the distillate.

6 Claims, 3 Drawing Figures

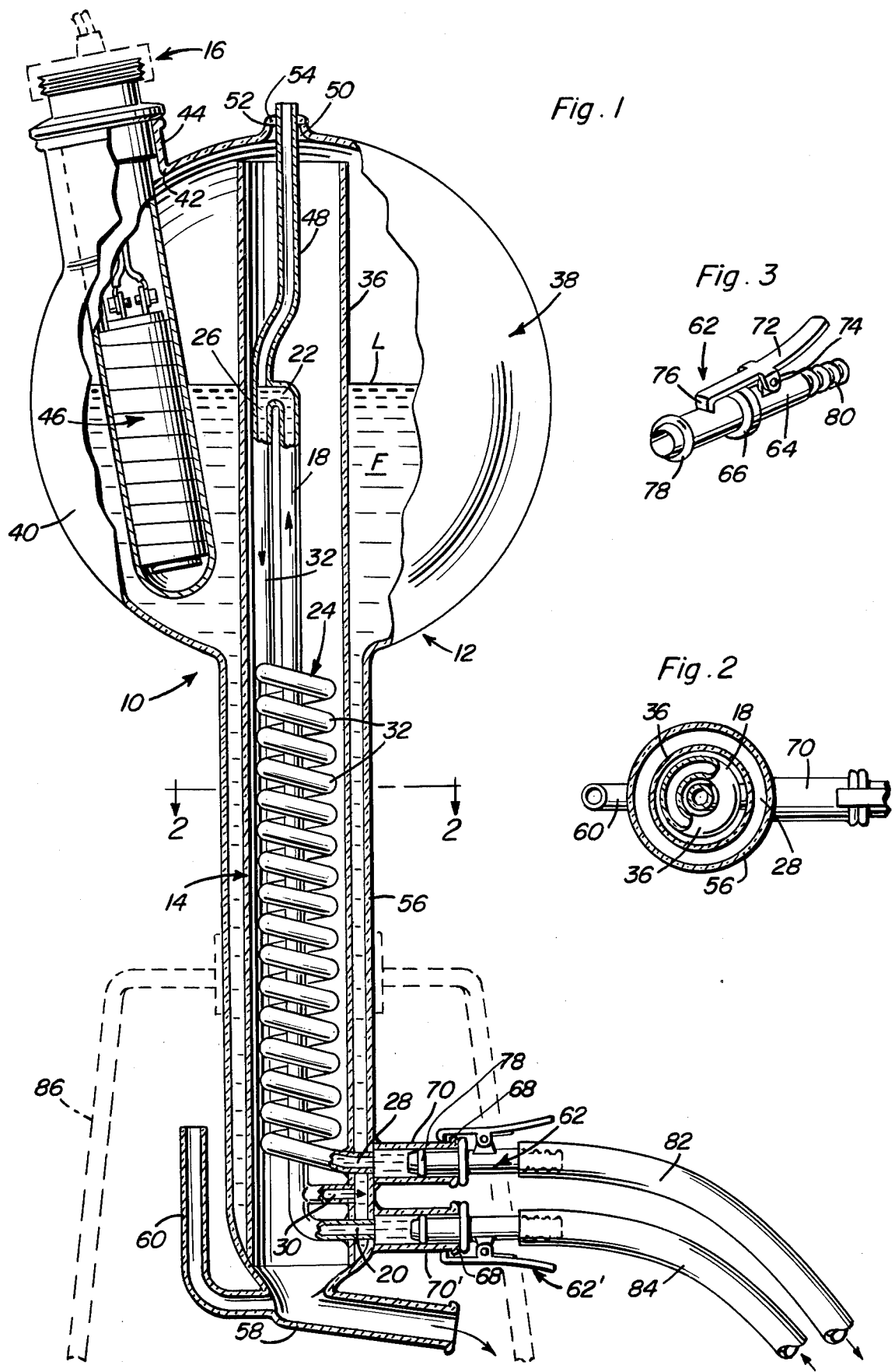

PORTABLE WATER DISTILLATION APPARATUS

BACKGROUND OF THE INVENTION

1. Field of the Invention

This invention relates generally to distillation apparatus, and particularly to portable water distillation apparatus capable of quick connection and disconnection to available water supplies.

2. Description of the Prior Art

Distilled water is frequently desirable for various household and automotive purposes, such as for use in steam irons and in automobile storage batteries. Further, in many areas tap water is not suitable for drinking, and consequently bottled water must be purchased for drinking purposes. Accordingly, although distilled and bottled water can generally be purchased in supermarkets, and the like, it is desirable for households to have water distillation equipment in order to distill tap water for drinking and other purposes.

I am aware of the following patents that may be pertinent to the invention:

U.S. Pat. No. 1,931,838, Oct. 24, 1933;
U.S. Pat. No. 1,966,938, July 17, 1934;
U.S. Pat. No. 3,292,683, Dec. 20, 1966;
U.S. Pat. No. 3,505,172, Apr. 7, 1970;
U.S. Pat. No. 3,694,321, Sept. 26, 1972.

SUMMARY OF THE INVENTION

It is an object of the present invention to provide a portable distillation apparatus which is quickly connectible and disconnectible to a suitable supply of water or other suitable liquid to be distilled.

It is another object of the present invention to provide a distillation apparatus which requires only a source of water under pressure and a nominal source of electrical energy, and the like.

These and other objects are achieved according to the present invention by providing a distillation apparatus having: an evaporator arranged for vaporizing fluid to be distilled; a condenser connected to the evaporator so as to be in communication therewith for condensing vaporized fluid received from the evaporator; and a heater associated with the evaporator for applying heat to and vaporizing fluid in the evaporator. The condenser includes an arrangement for maintaining a constant level in the evaporator of the fluid to be distilled.

According to a preferred embodiment of the present invention, the condenser includes a normally substantially vertically disposed tube having a lower fluid intake end and an upper fluid discharge end, and a substantially vertically disposed coiled conduit extending along an axis parallel to the tube of the condenser and having a fluid inlet end connected to the fluid discharge end of the tube and a fluid output end disposed adjacent the fluid intake end of the condenser tube. Arrangement of a sleeve around the tube and coiled conduit results in the formation of a heat exchanger which comprises the condenser.

The level control means advantageously includes an outlet provided in the tube of the condenser for feeding fluid being carried by the tube out of the sleeve and into the evaporator so as to maintain the level of fluid in the evaporator substantially co-planar with the upper fluid discharge end of the condenser tube.

The coiled conduit of the condenser includes a plurality of coils, with the tube of the condenser being arranged extending through the center of the coils. In addition, the sleeve, that is disposed about the tube and coiled conduit to form a shell of the heat exchanger, extends above the connection of the tube and conduit so as to be above the normal level of fluid contained within the evaporator. In this manner, only vapor created in the evaporator will be forced into the sleeve and downwardly through the condenser to be recovered as a distillate the bottom of the condenser.

The evaporator preferably includes a substantially vertically disposed, elongated housing encapsulating the condenser and provided with an enlarged portion disposed at the upper end of the condenser, with the heater being mounted on the enlarged portion for heating the fluid contained within the enlarged portion of the housing, the enlarged portion being a boiling chamber for the fluid being distilled.

The housing of the evaporator has additionally a condensing portion attached to the enlarged portion and containing that portion of the heat exchanger forming the condenser wherein the coils of the conduit are disposed. The outlet of the level control arrangement which connects the tube of the condenser to the evaporator is also advantageously disposed within the condensing portion, while a distilled water output is provided in the condensing portion in order to permit the distillate to be discharged from the apparatus.

The apparatus is advantageously provided with a fitting for connecting a hose, and the like, to the input and output of the condenser. Preferably, this fitting includes a longitudinally extending sleeve provided with a collar affixed thereto and arranged in a mid-portion of the sleeve for abutting a flange of a cooperating fitting provided on the apparatus. A clip is pivotally mounted on the sleeve for positively engaging a flange provided on the cooperating fitting and retaining the sleeve in the desired position. A seal, which may be in the form of a conventional O-ring, can be mounted on the sleeve adjacent a portion of the sleeve which engages the fitting for providing a liquid-tight seal between the fitting and the cooperating fitting provided on the apparatus.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, side elevational view, partly cut away and in section, showing a distillation apparatus according to the present invention.

FIG. 2 is a fragmentary, sectional view taken generally along the line 2—2 of FIG. 1.

FIG. 3 is a perspective view showing a fitting specifically intended for use with the distillation apparatus according to the present invention.

DESCRIPTION OF THE PREFERRED EMBODIMENTS

Referring now more particularly to FIGS. 1 and 2 of the drawings, a distillation apparatus 10 according to the present invention includes an evaporator 12 for vaporizing fluid being distilled, a condenser 14 connected to the evaporator 12 for condensing vaporized fluid received from evaporator 12, and a heater 16 associated with evaporator 12 for applying heat to and vaporizing fluid in evaporator 12.

Condenser 14 is formed by a normally substantially vertically disposed tube 18 having a lower fluid intake end 20 and an upper fluid discharge end 22, and a normally substantially vertically disposed coiled conduit 24 extending along an axis parallel to the tube 18 and having a fluid inlet end 26 connected to the fluid discharge end 22 of tube 18 and a fluid output end 28 disposed adjacent the fluid intake end 20 of tube 18. Also provided in tube 18 is an outlet 30 which forms a level control arrangement for maintaining a constant level of fluid to be distilled in evaporator 12 by feeding the fluid being carried by tube 18 into evaporator 12 and maintaining the level of fluid F in evaporator 12 at a level L substantially co-planar with the upper fluid discharge end 22 of tube 18.

Conduit 24 advantageously includes the illustrated plurality of coils 32 terminating in a straight portion 34 which forms the connection of inlet end 26 to discharge end 22, with tube 18 being arranged extending centrally through the coils 32. Condenser 14 further includes a sleeve 36 disposed about the tube 18 and conduit 24 combination, with sleeve 36 extending above the connection of the tube 18 and conduit 24 to one another at discharge end 22 and inlet end 26 so that the upper end of sleeve 36 is disposed above the normal level L of the fluid in evaporator 12. It will be appreciated that sleeve 36 effectively forms the shell of a tube-and-shell heat exchanger which comprises condenser 14.

Evaporator 12 includes a normally substantially vertically disposed elongated housing 38 encapsulating the heat exchanger of condenser 14 and provided with an enlarged portion 40 disposed at the upper end of condenser 14. The enlarged portion 40 is provided with an opening 42 and associated fitting 44 in an upper portion of portion 40 for receiving a, for example, conventional hermetically sealed quartz heater 46, and the like, removably mounted in opening 42 and immersed in the fluid F in the boiling chamber formed within enlarged portion 40.

Heater 46 may be connected to a, for example, conventional source of electric energy (not shown) such as a battery or conventional household electrical outlet.

A vent pipe 48 is attached to tube 18 and conduit 24 at the connection therebetween, with the enlarged portion 40 of evaporator 12 including an aperture 50 provided in the uppermost portion thereof. Vent pipe 48 is arranged in aperture 50 for passing excess fluid from the flow path of condenser 14 defined by tube 18 and conduit 32. More specifically, a nipple 52 is formed in the uppermost portion of enlarged portion 40, with a bead of silicon, and the like, being placed between the wall of nipple 52 and vent pipe 48 in order to form a seal 54 at the juncture of nipple 52 and pipe 48.

Although the material from which evaporator 12 and condenser 14 are constructed may be selected from any suitable, known material, it is preferable that the apparatus be constructed from a suitable glass or similar substance. Since the techniques for forming apparatus 10 from a glass material are well known and commonly employed, such techniques will not be described herein.

Evaporator 12 further comprises a condensing portion 56 attached to enlarged portion 40 and containing coils 32 of conduit 24 as well as portions of tube 18 and sleeve 36. Further, the outlet 30 which feeds the fluid to be distilled into the evaporator 12 is advantageously disposed within the lower part of condensing portion 56. A distilled water output 58 is provided also in the lower part of condensing portion 56, with the lower end of sleeve 36 being in sealed communication with this output 58 as by connection of the lower end of sleeve 36 to the walls of the lower part of condensing portion 56. Output 58 is arranged for receiving vapor from the boiling chamber formed by enlarged portion 40 and condensing the vapor by causing same to pass downwardly along the coils 32 within the sleeve 36 so as to be condensed and received at the bottom or lower part of condensing portion 56 as a distillate.

A safety vent 60 is advantageously provided in the lower part of condensing portion 56, or in output 58 as shown in FIG. 1, and disposed extending upwardly so as to prevent the condensed vapors falling into the bottom of condensing portion 56 from backing upwardly into sleeve 36 more than a predetermined desired distance in the event of a blockage or stoppage of the discharge of the distillate from output 58.

Referring now more particularly to FIG. 3 of the drawings, a fitting 62, and 62' (FIG. 1), specifically adapted for use with apparatus 10 includes a longitudinally extending sleeve 64 provided with a collar 66 affixed thereto and arranged in a mid-portion of sleeve 64 for abutting a flange 68 (FIG. 1) of a cooperating fitting 70, and 70' (FIG. 1), affixed to the lower side wall of condensing portion 56. A clip 72 is pivotally mounted on sleeve 64 as at pivot 74 and is provided with a downwardly turned lip 76 which engages the flange 68 of the cooperating fitting. A conventional O-ring 78, and the like, can be mounted on sleeve 64 adjacent a portion of sleeve 64 engaging the cooperating fitting 70, 70' for providing a seal in the resulting joint formed by insertion of sleeve 64 into the fitting 70, 70'. Threads 80 are provided at the end of longitudinally extending hollow body member or sleeve 64 for facilitating attachment of hoses 82 and 84 as seen in FIG. 1.

As will be readily appreciated from FIG. 1, the fittings 70 and 70' communicate with the intake end 20 and output end 28 of tube 18 and conduit 24, respectively, in order to connect the cooling medium flow path of condenser 14 to a source of liquid, such as a water tap and sink drain, neither of which is shown.

Also as shown in FIG. 1, a suitable stand 84 may be employed to support apparatus 10 within a conventional kitchen sink, and the like, not shown but sufficiently well known and commonly employed.

As will be readily understood from the above description and from the drawings, a distillation apparatus according to the invention provides a readily portable, efficient, yet rugged and effective means for assuring suitable water, or other suitable liquid, within one's own residence or recreational vehicle and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A distillation apparatus, comprising, in combination:

(a) evaporator means for vaporizing fluid to be distilled;

(b) condenser means connected to the evaporator means for condensing vaporized fluid received from the evaporator means;

(c) heater means associated with the evaporator means for applying heat to and vaporizing fluid in the evaporator means;

(d) the condenser means being arranged extending below a surface of vaporizing liquid in the evaporator means, and including level control means for maintaining a constant level in the evaporator means of a fluid to be distilled, the condenser means further including a normally substantially vertically disposed tube having a lower fluid intake end and an upper fluid discharge end, and a substantially vertically disposed conduit extending along an axis parallel to the tube of the condenser means, the conduit having a fluid inlet end connected to the fluid discharge end of the tube and a fluid output end disposed adjacent the fluid intake end of the tube of the condenser means, with the level control means including an outlet provided in the tube for feeding fluid being carried by the tube into the evaporator means and maintaining the level of fluid in the evaporator means substantially co-planar with the upper fluid discharged end of the tube of the condenser means, and a hollow sleeve disposed about the tube and conduit, the sleeve arranged extending above the connection of the tube and conduit for receiving vaporized liquid and directing same downwardly over the conduit for condensing the vaporized liquid and forming a shell of a heat exchanger including the tube and conduit.

2. A structure as defined in claim 1, wherein the conduit of the condenser means includes a plurality of coils, and the tube of the condenser means is arranged extending centrally through the coils.

3. A structure as defined in claim 2, wherein the evaporator means includes a normally substantially vertically disposed elongated housing encapsulating the tube, conduit, and sleeve of the condenser means, and provided with an enlarged portion disposed at the discharge end of the tube and the inlet end of the conduit, with the heater means being mounted on the enlarged portion for heating the fluid contained within the enlarged portion of the housing, the enlarged portion being a boiling chamber, and wherein the enlarged portion of the housing has an opening provided therein, with a hermetically sealed quartz heater removably mounted in the opening and immersed in the fluid of the boiling chamber, the heater forming the heater means.

4. A structure as defined in claim 3, wherein the condenser means further includes a vent pipe attached to the tube and conduit at the connection therebetween, the enlarged portion of the evaporator means including an aperture provided in the uppermost portion thereof, and the vent pipe being arranged in the aperture for passing excess fluid from the condenser means.

5. A structure as defined in claim 4, wherein the evaporator means housing includes a condensing portion attached to the enlarged portion and containing coils of the coiled conduit, the outlet end of the control means connecting the tube of the condenser means with the condensing portion, and a distilled water output provided in the condensing portion, the sleeve of the condenser means being disposed in sealed communication with the distilled water output and arranged for receiving vapor from the boiling chamber of the enlarged portion of the evaporator means housing and condensing the vapor by passing same past the coiled conduit of the condenser means.

6. A structure as defined in claim 1, further including a fitting for a hose quickly connectible and disconnectible to a cooperating fitting attached to the evaporator means, the cooperating fitting including a flange, and the fitting comprising, in combination:

(1) a longitudinally extending hollow body member provided with a collar affixed thereto and arranged in a mid-portion of the body member for abutting the flange of the cooperating fitting;

(2) clip means mounted on the body member for positively engaging the flange of the cooperating fitting and retaining the body member on the cooperating fitting; and (3) seal means mounted on the body member adjacent a portion of the body member engaging the cooperating fitting for providing a seal between the body member and the cooperating fitting.

* * * * *